(12) United States Patent
Noda

(10) Patent No.: US 10,525,352 B2
(45) Date of Patent: Jan. 7, 2020

(54) GAME PROCESSING METHOD AND RECORDING MEDIUM

(71) Applicant: Koei Tecmo Games Co., Ltd., Yokohama (JP)

(72) Inventor: Kazuki Noda, Yokohama (JP)

(73) Assignee: KOEI TECMO GAMES CO., LTD., Yokohama (JP)

( * ) Notice: Subject to any disclaimer, the term of this patent is extended or adjusted under 35 U.S.C. 154(b) by 0 days.

(21) Appl. No.: 15/853,854

(22) Filed: Dec. 25, 2017

(65) Prior Publication Data

US 2018/0178124 A1    Jun. 28, 2018

(30) Foreign Application Priority Data

Dec. 26, 2016    (JP) ................... 2016-252003

(51) Int. Cl.
*A63F 9/24* (2006.01)
*A63F 13/00* (2014.01)
*G06F 17/00* (2019.01)
*G06F 19/00* (2018.01)
*A63F 13/5255* (2014.01)
*G06F 3/0481* (2013.01)
*G06F 3/0346* (2013.01)
*G02B 27/01* (2006.01)
*A63F 13/428* (2014.01)

(52) U.S. Cl.
CPC ........ *A63F 13/5255* (2014.09); *A63F 13/428* (2014.09); *G02B 27/017* (2013.01); *G06F 3/0346* (2013.01); *G06F 3/04815* (2013.01); *A63F 2300/6661* (2013.01)

(58) Field of Classification Search
CPC ... A63F 13/525; A63F 13/5252; A63F 13/525
See application file for complete search history.

(56) References Cited

U.S. PATENT DOCUMENTS

| 6,699,127 B1* | 3/2004 | Lobb ...................... A63F 13/10 |
| | | 345/418 |
| 2002/0065121 A1* | 5/2002 | Fukunaga ............... A63F 13/08 |
| | | 463/8 |
| 2016/0317913 A1* | 11/2016 | Chen ....................... A63F 13/92 |

FOREIGN PATENT DOCUMENTS

JP         07-116343         5/1995

OTHER PUBLICATIONS

Submission of Certification of Exceptions to Lack of Novelty of Invention filed in corresponding JP Application No. 2016-252003, Jan. 23, 2017, w/ Certification of Translation of the same, enclosing Certification to Receive Application of the Provisions of Exception to Lack of Novelty of Invention.

* cited by examiner

*Primary Examiner* — Milap Shah
*Assistant Examiner* — Jason Pinheiro
(74) *Attorney, Agent, or Firm* — Mori & Ward, LLP

(57) ABSTRACT

A game processing method executed by an information processing device includes switching a position of a virtual camera for generating an image of a first-person view point in a virtual three-dimensional space in a plurality of positions set in advance based on an operation input of a user. A direction of the virtual camera is controlled based on the operation input of the user. The direction of the virtual camera is corrected based on a positional relationship between a predetermined object present in the virtual three-dimensional space and the virtual camera when the position of the virtual camera is switched.

10 Claims, 13 Drawing Sheets

[FIG. 1]
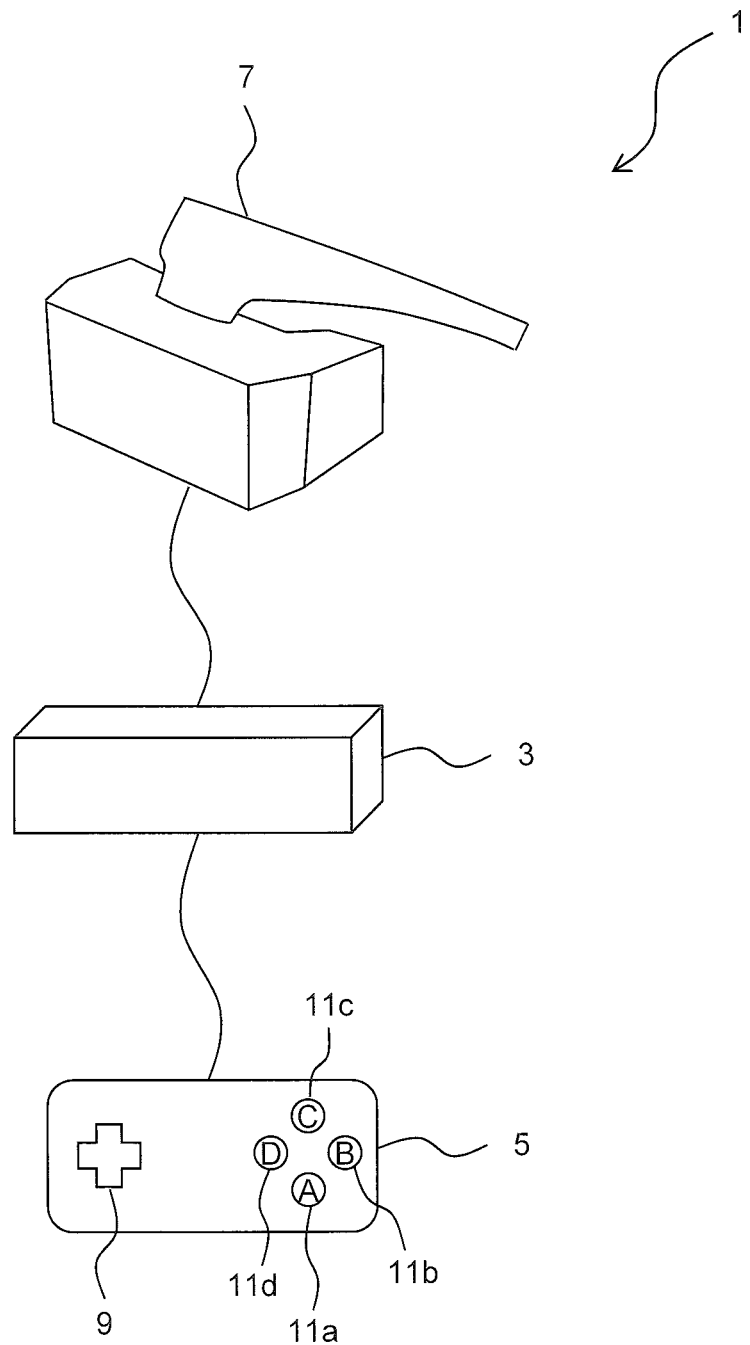

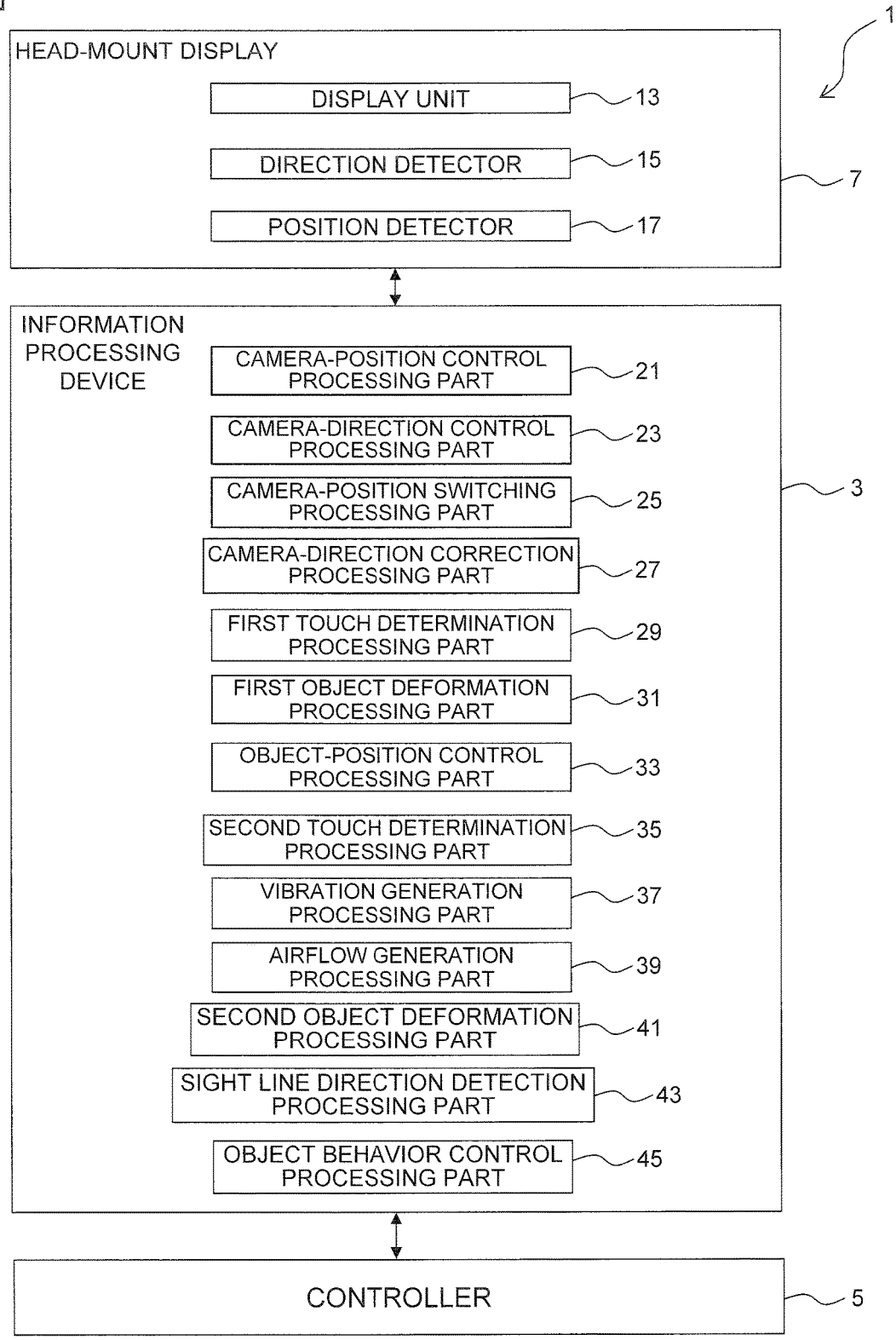
[FIG. 2]

[FIG. 3]
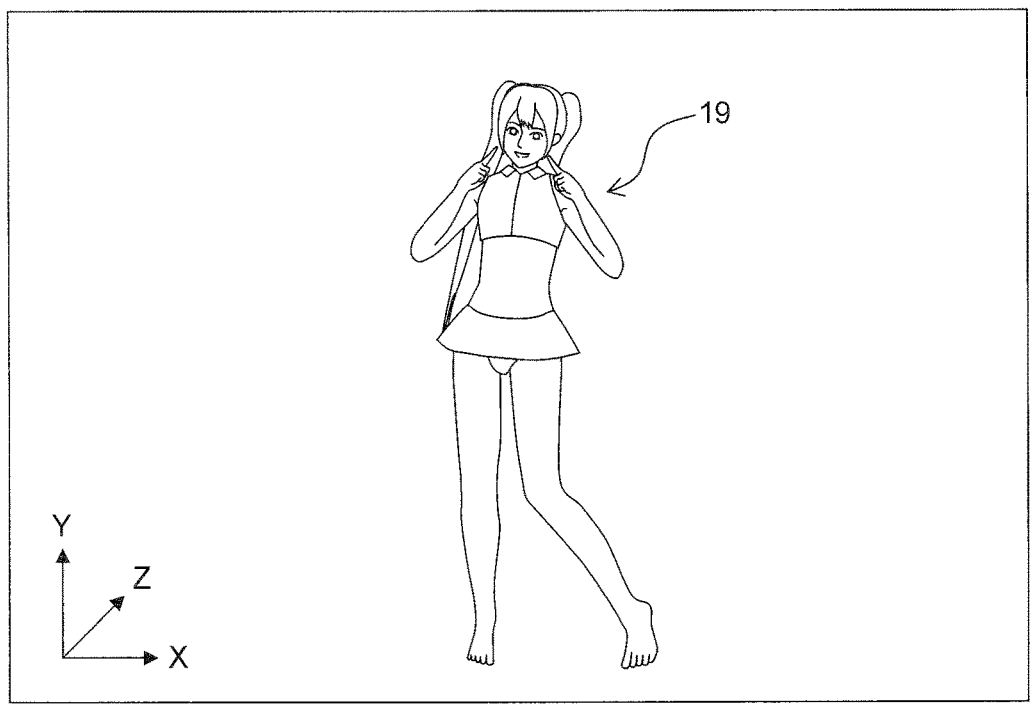

[FIG. 4]
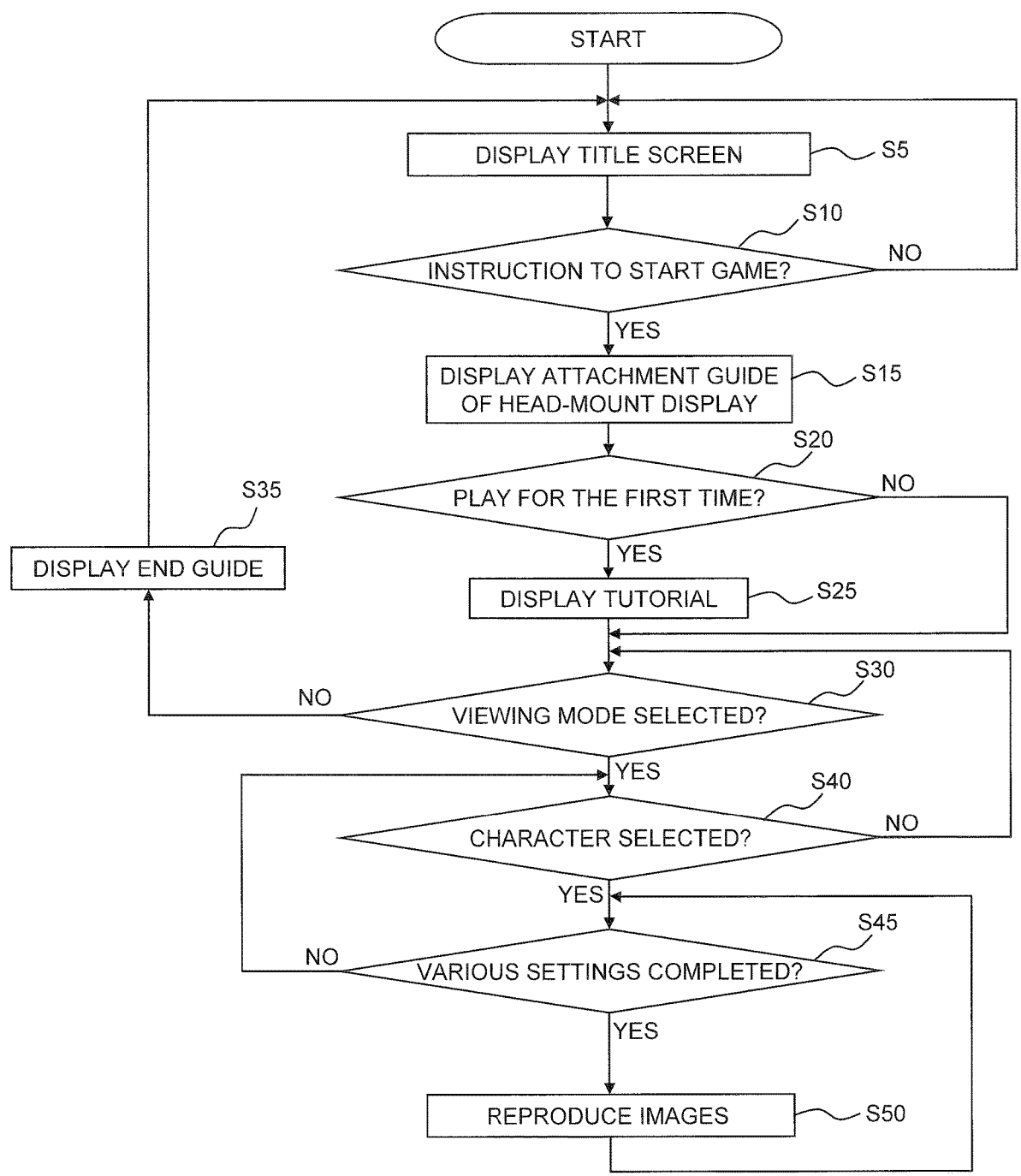

[FIG. 5]
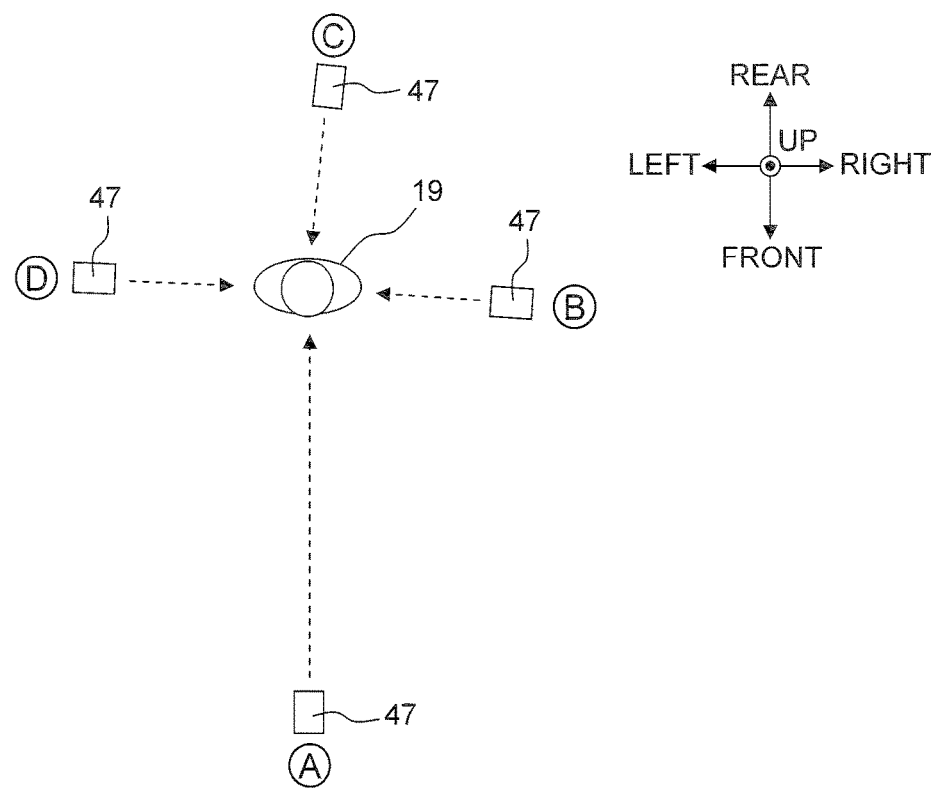
[FIG. 6]
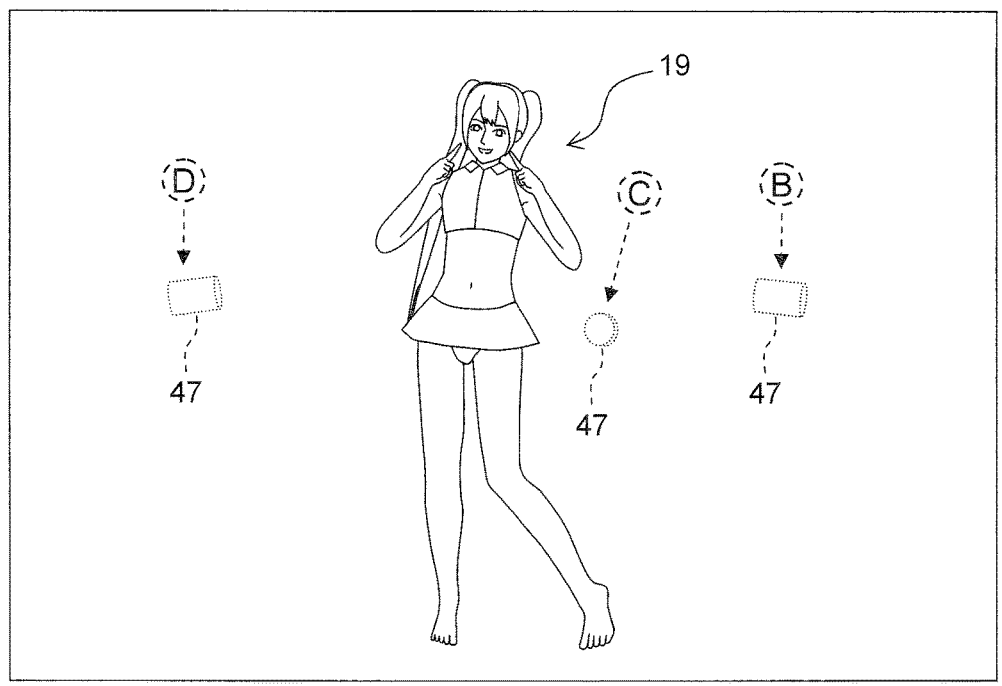

[FIG. 7]
[FIG. 8]
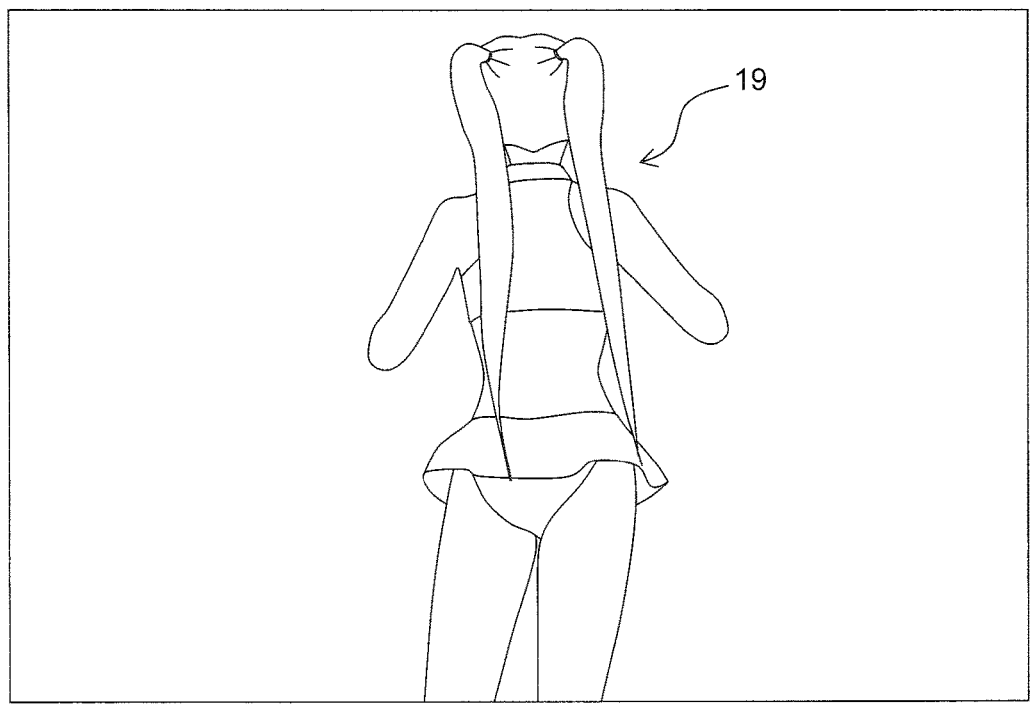

[FIG. 9]
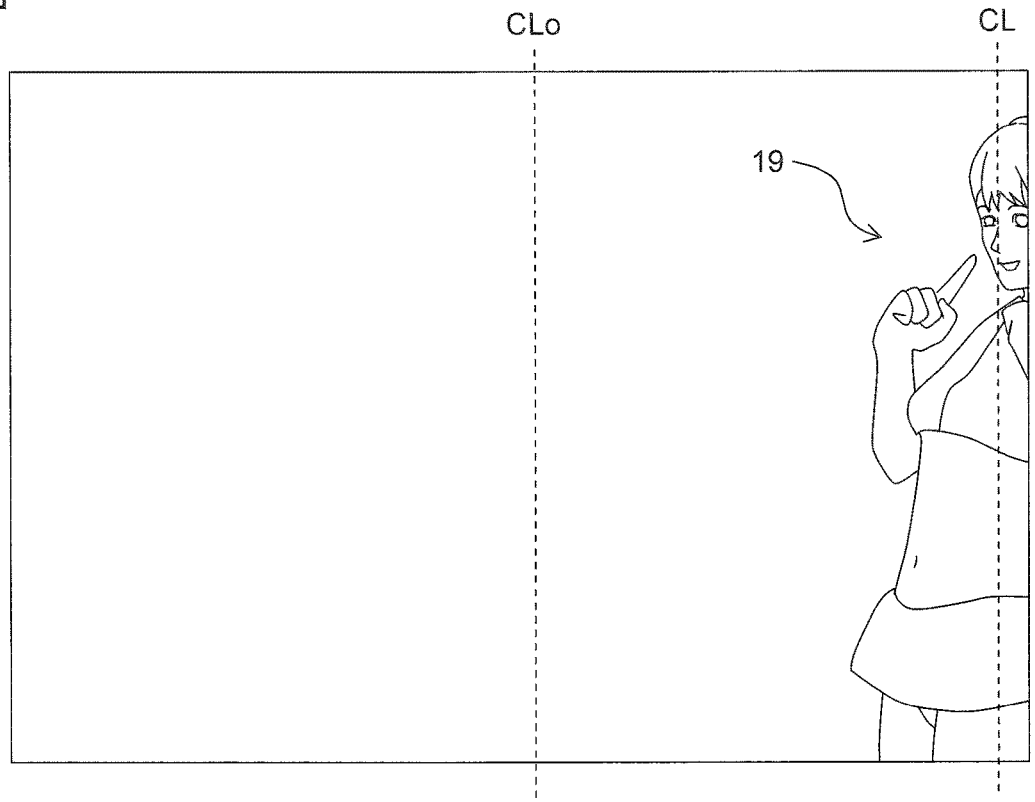
[FIG. 10]
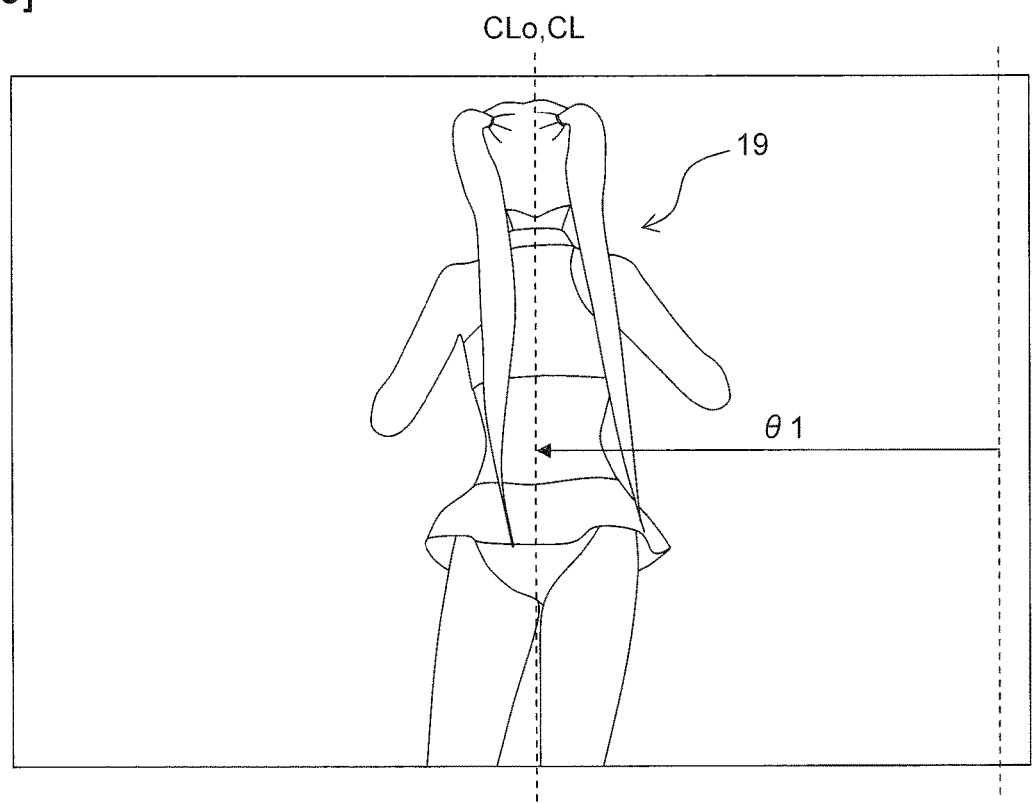

[FIG. 11]
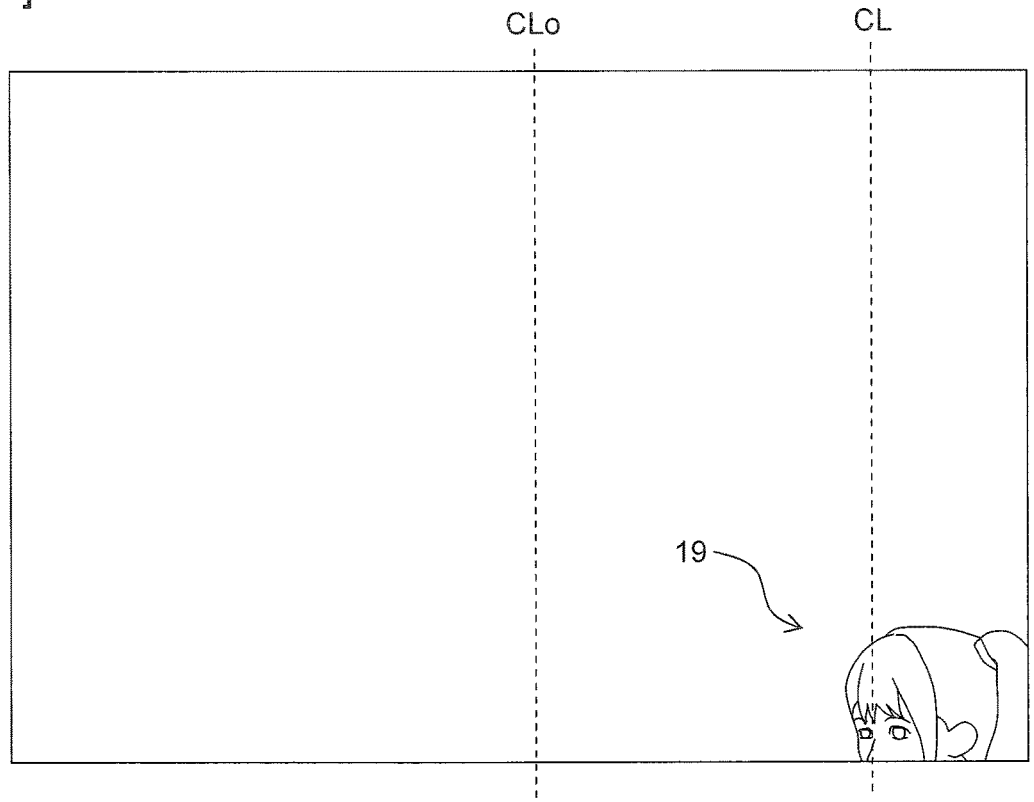
[FIG. 12]
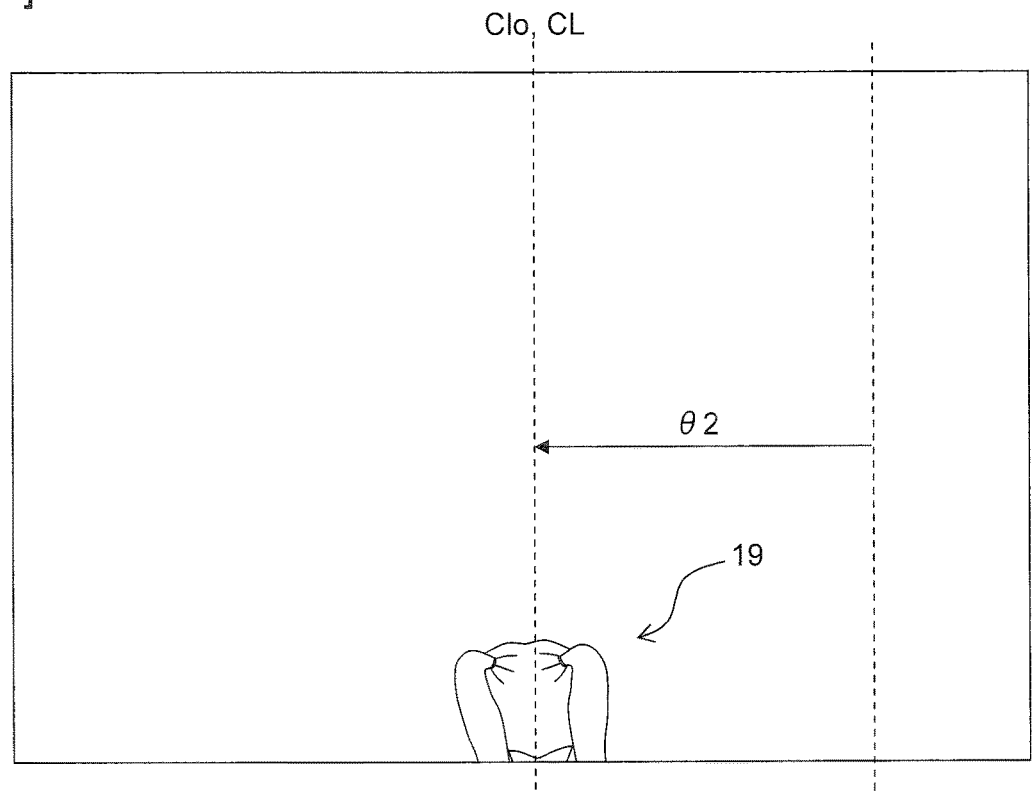

[FIG. 13]
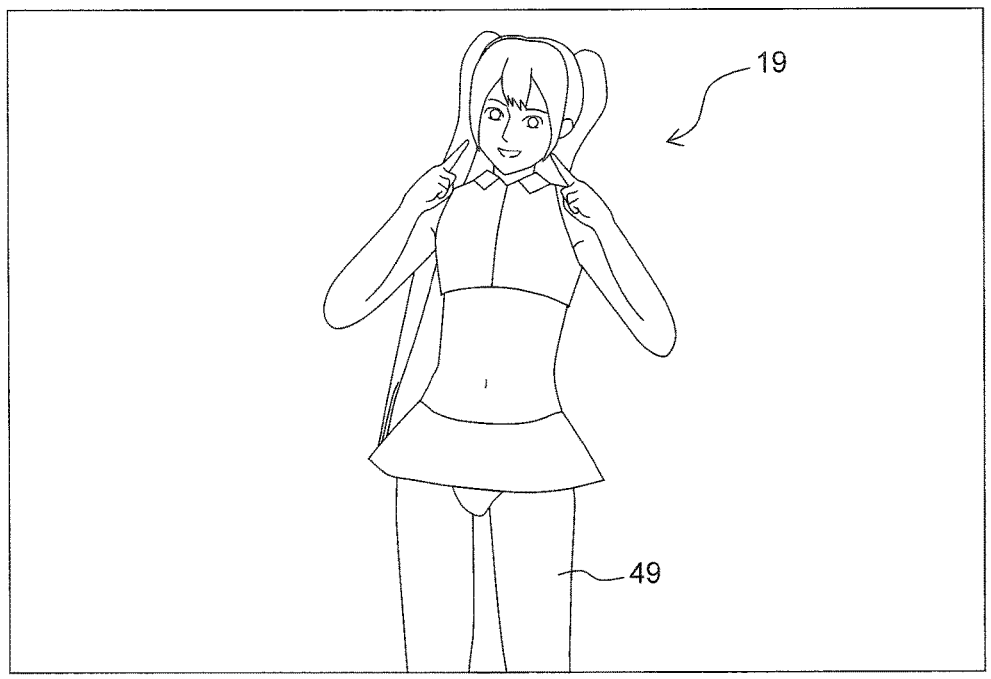
[FIG 14]
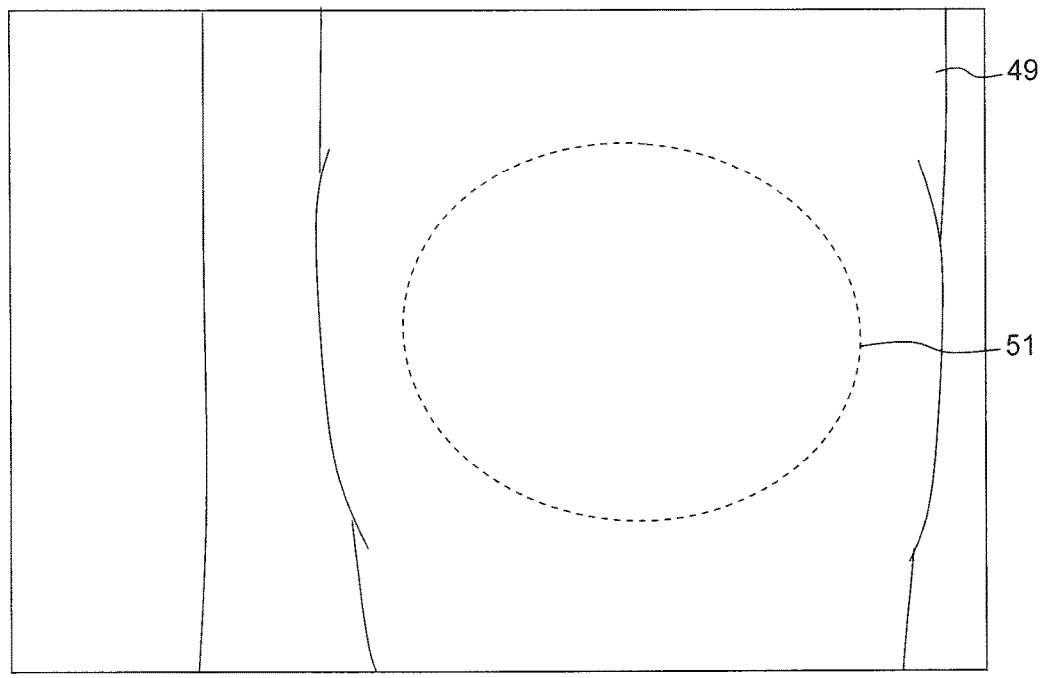

[FIG. 15]
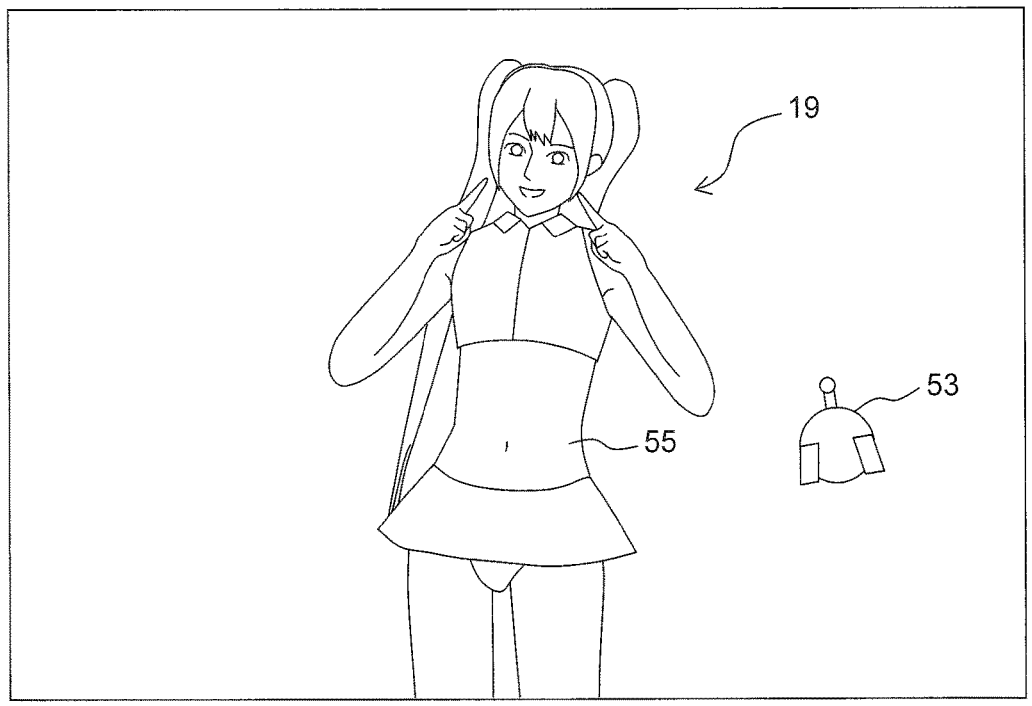
[FIG. 16]
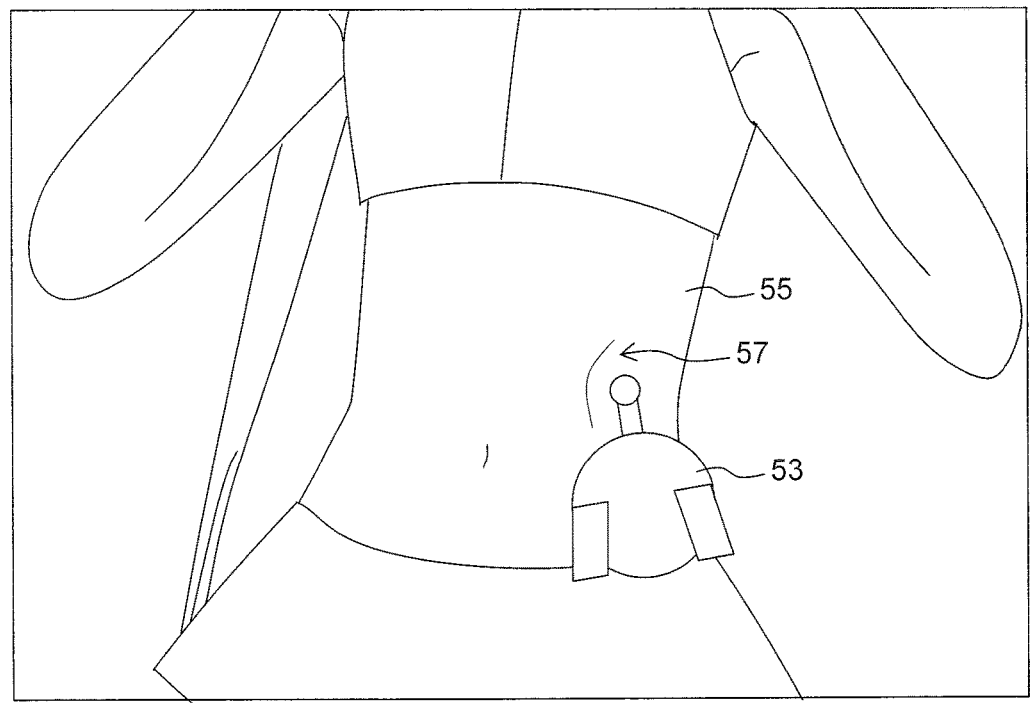

[FIG. 17]
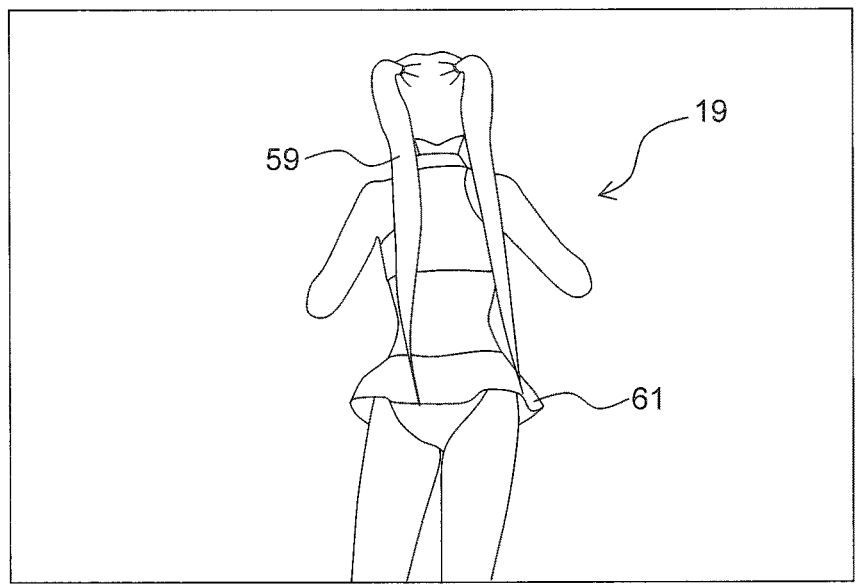
[FIG. 18]
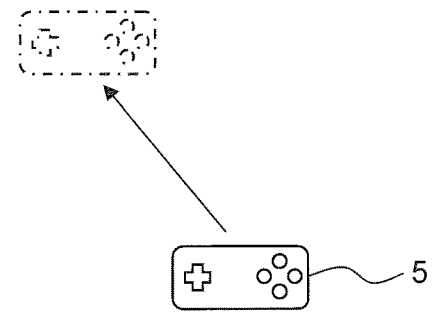
[FIG. 19]
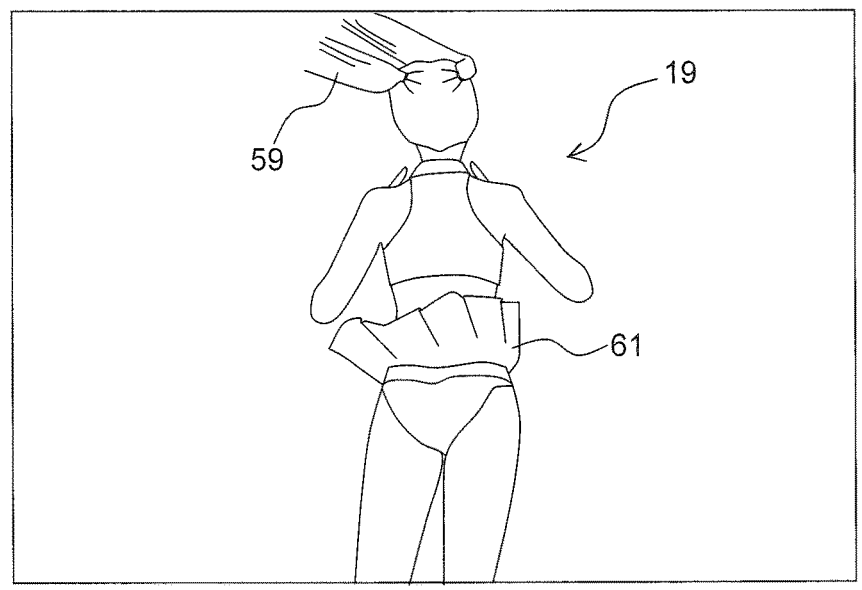

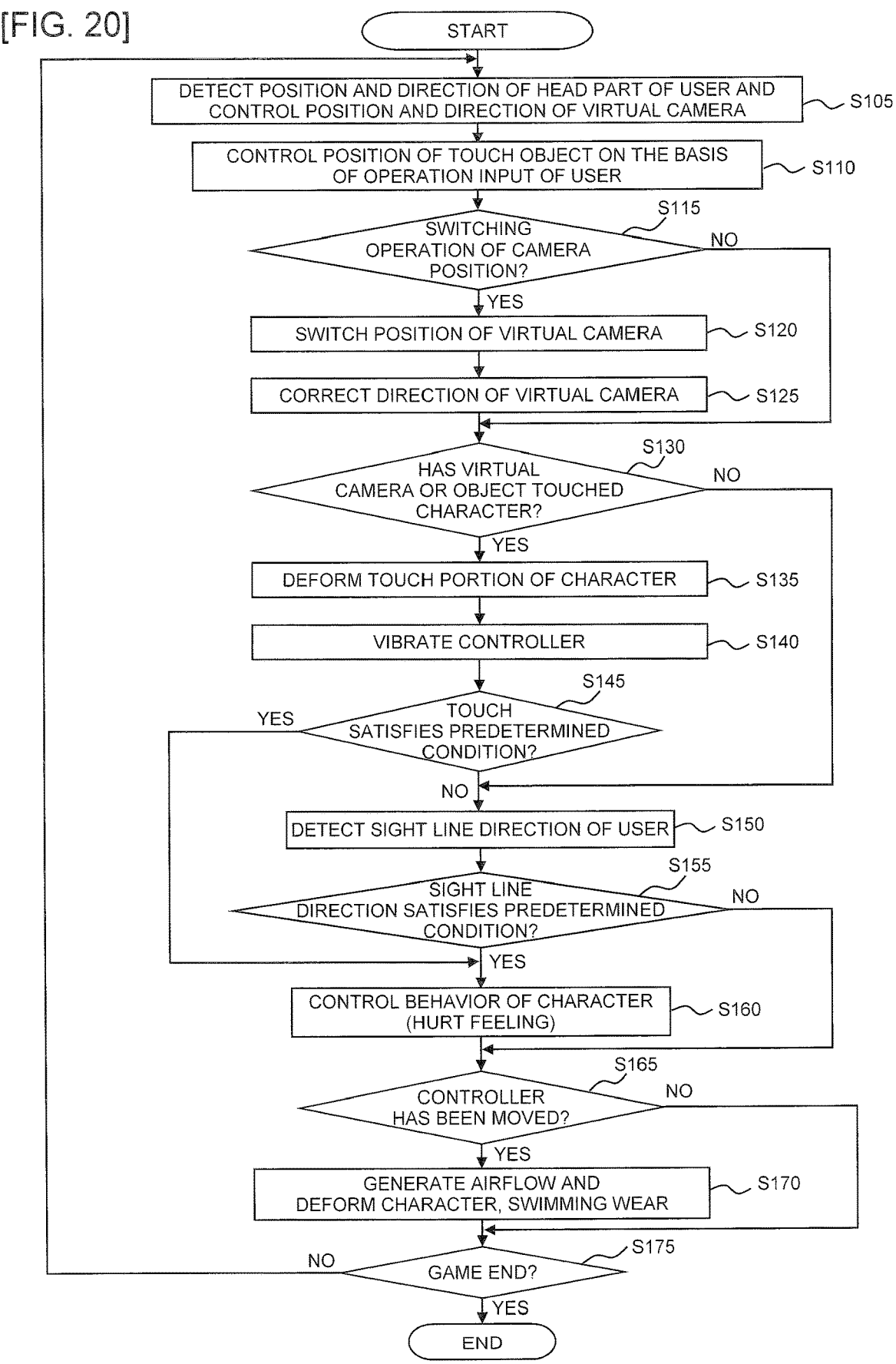
[FIG. 20]

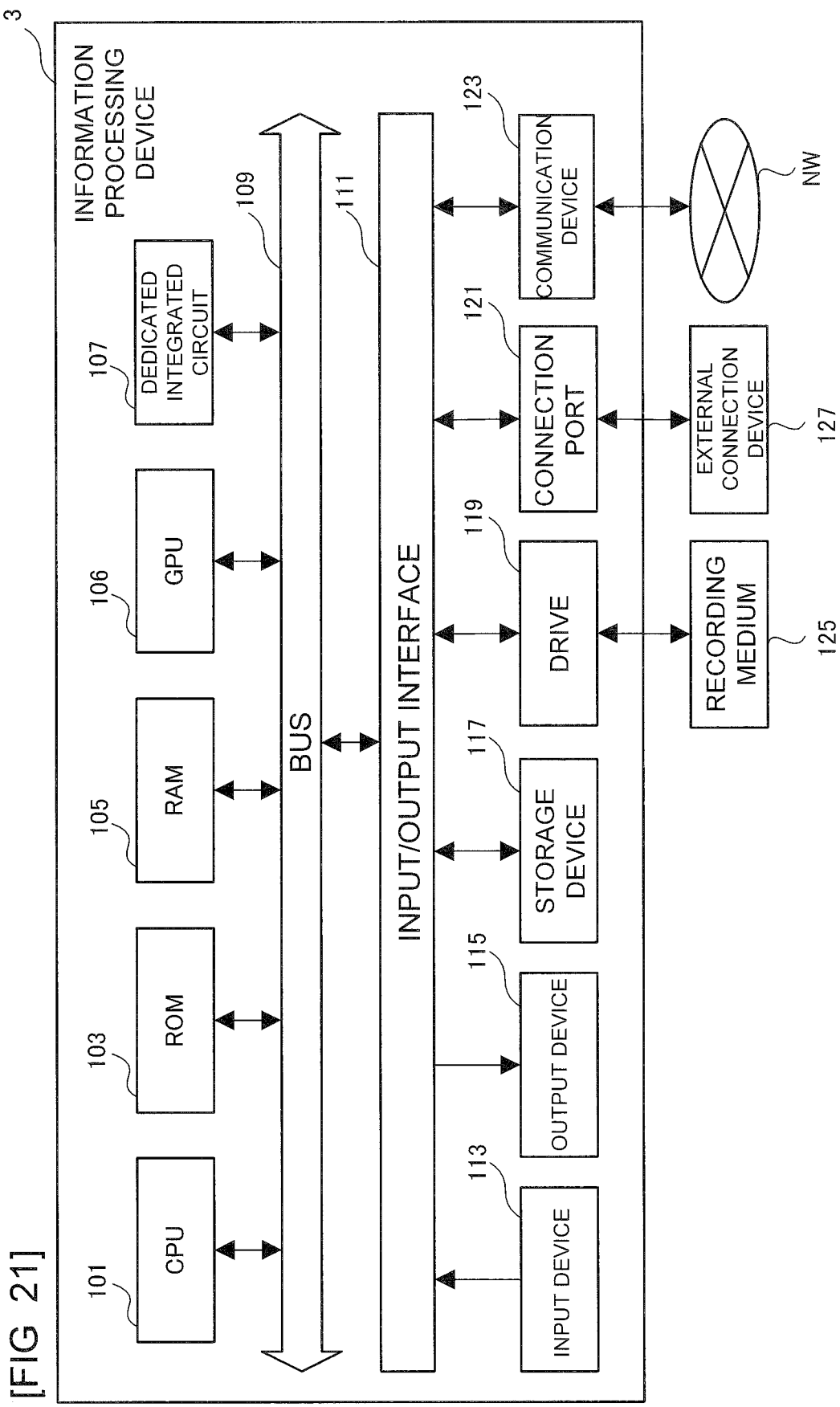

GAME PROCESSING METHOD AND RECORDING MEDIUM

CROSS-REFERENCE TO RELATED APPLICATION

The present application is based upon and claims the benefit of priority to Japanese Patent Application No. 2016-252003, filed Dec. 26, 2016. The entire contents of this application are incorporated herein by reference.

BACKGROUND OF THE INVENTION

Field of the Invention

The present invention relates to a game processing method and a recording medium.

Description of Background Art

Conventionally, an art of changing a view point of a three-dimensional video displayed on a display device has been known. JP, A, 07-116343, for example, describes an electronic game device having switching means operated by a user, and arithmetic processing means for selecting one piece of view-point information from a plurality of pieces of view-point information set in advance on the basis of a signal from the switching means and for displaying a display target on display means on the basis of the selected view point.

SUMMARY OF THE INVENTION

In a simulation game, a role playing game or the like, for example, a game in which a user can experience a predetermined event or the like in a virtual space by generating an image of a first-person view point, is known.

On the other hand, the prior art is a game by a so-called third-person view point in which, other than the view point of a driver who is a player character in a driving game, a view point from rear of its own vehicle, a view point from above the rear part of its own vehicle and the like are set capable of being switched. Thus, application of the first-person view point game as above is not considered, and a game in which a virtual space with more reality can be experienced is in demand.

The present invention was made in view of such problem and has an object to provide a game processing method and a recording medium capable of improving reality of the virtual space.

Means for Solving the Problem

According to one aspect of the present invention, a game processing method executed by an information processing device includes switching a position of a virtual camera for generating an image of a first-person view point in a virtual three-dimensional space in a plurality of positions set in advance based on an operation input of a user. A direction of the virtual camera is controlled based on the operation input of the user. The direction of the virtual camera is corrected based on a positional relationship between a predetermined object present in the virtual three-dimensional space and the virtual camera when the position of the virtual camera is switched.

According to another aspect of the present invention, a non-transitory recording medium readable by an information processing device stores a game program causing the information processing device to function as a camera-position switching processing part, a camera-direction control processing part, and a camera-direction correction processing part. The camera-position switching processing part switches a position of a virtual camera for generating an image of a first-person view point in a virtual three-dimensional space in a plurality of positions set in advance based on an operation input of a user. The camera-direction control processing part controls a direction of the virtual camera based on the operation input of the user. The camera-direction correction processing part corrects the direction of the virtual camera controlled by the camera-direction control processing part based on a positional relationship between a predetermined object present in the virtual three-dimensional space and the virtual camera when the position of the virtual camera is switched by the camera-position switching processing part.

Advantages of the Invention

According to the game processing method and the recording medium of the present invention, reality of the virtual space can be improved.

BRIEF DESCRIPTION OF THE DRAWINGS

FIG. 1 is a system configuration diagram showing an example of entire configuration of a game system related to an embodiment.

FIG. 2 is a block diagram showing an example of functional configuration of an information processing device and a head-mount display.

FIG. 3 is a view showing an example of an object.

FIG. 4 is a flowchart showing an example of an outline flow of a game.

FIG. 5 is an explanatory view for explaining an example of a switching position of a virtual camera.

FIG. 6 is a view showing an example of a display screen in the case that an A button is pressed.

FIG. 7 is a view showing an example of the display screen in the case that a B button is pressed.

FIG. 8 is a view showing an example of the display screen in the case that a C button is pressed.

FIG. 9 is an explanatory view for explaining an example of correction of a camera direction by a camera-direction correction processing part.

FIG. 10 is an explanatory view for explaining the example of correction of the camera direction by the camera-direction correction processing part.

FIG. 11 is an explanatory view for explaining another example of correction of the camera direction by the camera-direction correction processing part.

FIG. 12 is an explanatory view for explaining another example of correction of the camera direction by the camera-direction correction processing part.

FIG. 13 is an explanatory view for explaining an example of deformation of a female character by a touch with the virtual camera.

FIG. 14 is an explanatory view for explaining the example of deformation of the female character by a touch with the virtual camera.

FIG. 15 is an explanatory view for explaining an example of deformation of the female character by a touch with a touch object.

FIG. 16 is an explanatory view for explaining an example of deformation of the female character by a touch with the touch object.

FIG. 17 is an explanatory view for explaining an example of generation of virtual airflow by an operation of a controller and deformation of the object by the airflow.

FIG. 18 is an explanatory view for explaining the example of generation of virtual airflow by the operation of the controller and deformation of the object by the airflow.

FIG. 19 is an explanatory view for explaining the example of generation of virtual airflow by the operation of the controller and deformation of the object by the airflow.

FIG. 20 is a flowchart showing an example of a processing procedure executed by a CPU of the information processing device.

FIG. 21 is a block diagram showing an example of hardware configuration of the information processing device.

DETAILED DESCRIPTION OF THE EMBODIMENTS

An embodiment of the present invention will be described below by referring to the drawings.

1. Entire Configuration of Game System

First, an example of entire configuration of a game system 1 related to this embodiment will be described by using FIG. 1. As shown in FIG. 1, the game system 1 has an information processing device 3, a controller 5, and a head-mount display 7. Each of the controller 5 and the head-mount display 7 is connected to the information processing device 3, capable of communication (capable of transmission/reception of a signal). Note that, although a case of wired connection is shown in FIG. 1, connection may be made wirelessly.

The information processing device 3 is an installed type game machine, for example. However, that is not limiting, and it may be a portable game machine integrally including an input part or the like, for example. Moreover, other than the game machine, it may be those manufactured and sold as a computer such as a server computer, a desktop computer, a laptop computer, a tablet computer and the like, for example, or those manufactured and sold as a telephone such as a mobile phone, a smartphone, a phablet and the like.

A user performs various operation inputs by using the controller 5 (an example of an input device). In the example shown in FIG. 1, the controller 5 has a cross key 9, a plurality of buttons 11a-11d and the like, for example. Hereinafter, the button 11a is described as an "A button 11a", the button 11b as a "B button 11b", the button 11c as a "C button 11c", and the button 11d as a "D button 11d" as appropriate, and in the case that the buttons are not discriminated, they are simply described as the "button 11". Note that, instead of or in addition to the above, the controller 5 may have a joy stick, a touch pad and the like, for example.

The head-mount display 7 is a display device capable of being attached to a head part or a face part of the user. The head-mount display 7 displays an image (including a still image and a moving image) related to a game generated by the information processing device 3. Note that, the head-mount display 7 may be either of a transparent type or a nontransparent type.

2. Outline Configuration of Head-Mount Display

Subsequently, an example of outline configuration of the head-mount display 7 will be described by using FIG. 2. As shown in FIG. 2, the head-mount display 7 has a display unit 13, a direction detector 15, and a position detector 17.

The display unit 13 is constituted by a liquid crystal display, an organic EL display or the like, for example, and displays an image related to the game. The direction detector 15 is constituted by an acceleration sensor, a gyro sensor and the like, for example, and detects a direction of the head part (direction of the face) of the user. The position detector 17 is constituted by a camera installed outside of the head-mount display 7 and marks such as a light emission part installed on the head-mount display 7 and the like, for example, and detects a position of the head part of the user. Note that, each of the detectors may have configuration other than the above.

The information processing device 3 changes the image to be displayed on the display unit 13 on the basis of detection results of the direction detector 15 and the position detector 17 in accordance with the direction or the position of the head part of the user and expresses a realistic virtual reality (hereinafter referred to also as a "VR" (virtual reality) as appropriate). Note that, the device may be made to also detect the position of the controller 5 so that the image to be displayed on the display unit 13 is changed in accordance with movement of the head part of the user and an operation of the controller 5.

Note that, a configuration form of the head-mount display 7 is not limited to the above. Although explanation was omitted in the above, the head-mount display 7 may have an earphone or a headphone mounted, for example.

3. Outline Contents of Game

Subsequently, the game related to this embodiment, that is, an example of outline contents of a game provided by execution of a game program and a game processing method of the present invention by the information processing device 3 will be described by using FIGS. 3 and 4.

The game related to this embodiment is played such that the user can observe an object arranged in a virtual space from a desired direction and distance, for example, by generating a first-person view point image in a virtual three-dimensional space in accordance with movement of the head part by the user and an operation input of the controller 5. A type of the object is not particularly limited but includes a male character, a female character of human beings, an animal character other than the human beings, a virtual living beings character other than the human beings or animals or an object other than living beings, for example. In this embodiment, as shown in FIG. 3, a case that an object is a female character 19 (an example of a first object) is explained as an example. Note that, in the three-dimensional virtual space, an XYZ coordinate system with a horizontal plane as an XZ plane and a vertical axis as a Y-axis is set.

FIG. 4 shows an example of a flow of the game executed by the information processing device 3.

At Step S5, the information processing device 3 has a title screen of the game displayed on the display unit 13 of the head-mount display 7.

At Step S10, the information processing device 3 determines whether or not there is an instruction input to start the game by the user. The instruction input to start the game is selection of a menu in a VR mode on the title screen or the like, for example. In the case that there is no instruction input to start the game (Step S10: NO), the routine returns to Step S5 and continues display of the title screen. On the other hand, in the case that there is the instruction input to start the game (Step S10: YES), the routine proceeds to the subsequent Step S15.

At Step S15, the information processing device 3 has attachment guide displayed on the display unit 13 of the head-mount display 7 in order to explain how to attach the head-mount display 7 and the like to the user. In the case that the head-mount display 7 is not connected to the information processing device 3, for example, display for prompting connection is made.

At Step S20, the information processing device 3 determines whether or not the play by the VR in the game is for the first time by referring to a history of save data or the like, for example. In the case that this is the first time (Step S20: YES), the routine proceeds to the subsequent Step S25. On the other hand, in the case that it is not the first time (Step S20: NO), the routine proceeds to Step S30 which will be described later.

At Step S25, the information processing device 3 has a tutorial for explaining how to play by the VR in the game displayed on the display unit 13 of the head-mount display 7.

At Step S30, the information processing device 3 has a selection screen of a viewing mode displayed on the display unit 13 of the head-mount display 7, and determines whether or not the viewing mode is selected by the user. The viewing mode is for the user to set what behavior of the female character 19 is to be viewed, and in this embodiment, for example, an "event mode", a "gravure mode", a "photo mode" and the like are prepared. The "event mode" is a mode in which events such as opening, activities, changing clothes and the like viewed once in the game can be freely viewed. The "gravure mode" is a mode in which a gravure viewed once in the game can be freely viewed. The "photo mode" is a mode in which the female character 19 is made to take desired posing and can be freely photographed.

In the case that the selection of the viewing mode is cancelled (Step S30: NO), the routine proceeds to the subsequent Step S35, and the information processing device 3 has an end guide such as an instruction to remove the head-mount display 7 or the like displayed on the display unit 13 of the head-mount display 7. After that, the routine returns to the previous Step S5, and the title screen is displayed. On the other hand, in the case that the viewing mode is selected (Step S30: YES), the routine proceeds to the subsequent Step S40.

At Step S40, the info illation processing device 3 has a selection screen of a character displayed on the display unit 13 of the head-mount display 7, and determines whether or not the character to be viewed is selected by the user. In the case that the selection of the character is cancelled (Step S40: NO), the routine returns to Step S30, and the selection screen of the viewing mode is displayed. On the other hand, in the case that the character is selected (Step S40: YES), the routine proceeds to the subsequent Step S45.

At Step S45, the information processing device 3 has various setting screens displayed on the display unit 13 of the head-mount display 7, and determines whether or not various settings are made by the user. The various settings include scenes to be viewed (place, time (morning, daytime, evening, night) and the like), poses, clothes (swimming wear, costume and the like), skin state (tanned, wet degrees and the like) and the like, for example, but may include those other than them. In the case that the setting is cancelled (Step S45: NO), the routine returns to Step S40, and the selection screen of the character is displayed. On the other hand, in the case that various settings are made (Step S45: YES), the routine proceeds to the subsequent Step S50.

At Step S50, the information processing device 3 reproduces and displays an image (including a still image and a moving image) of the female character 19 selected in the selected viewing mode on the display unit 13 of the head-mount display 7 in accordance with the various conditions set as above. In the case that the reproduction is finished, the routine returns to Step S45, and the various setting screens are displayed.

Note that, the processing at all the Steps described above may be executed in the "VR mode" in which the image to be displayed on the display unit 13 is changed in accordance with movement of the head part of the user, or may be executed in a "normal mode" in which only Steps in a part of Step S25 and Step S50 and the like are executed in the VR mode and for the other Steps, movement of the head part of the user is not reflected in the image on the display unit 13, for example.

The contents of feature portions of the game related to this embodiment will be described below in detail. Note that, the processing contents described below are executed during reproduction in the viewing mode at Step S50, and are applied in any of the viewing modes, that is, the "event mode", the "gravure mode", and the "photo mode".

4. Functional Configuration of Information Processing Device

Subsequently, by using the aforementioned FIG. 2 and FIGS. 5-19, an example of functional configuration mainly related to reproduction in the viewing mode in the functional configuration of the information processing device 3 will be described.

As shown in FIG. 2, the information processing device 3 has a camera-position control processing part 21, a camera-direction control processing part 23, a camera-position switching processing part 25, a camera-direction correction processing part 27, a first touch determination processing part 29, a first object deformation processing part 31, an object-position control processing part 33, a second touch determination processing part 35, a vibration generation processing part 37, an airflow generation processing part 39, a second object deformation processing part 41, a sight line direction detection processing part 43, and an object behavior control processing part 45.

The camera-position control processing part 21 controls a position of a virtual camera for generating an image of a first-person view point in the virtual three-dimensional space on the basis of the operation input of the user. In this embodiment, the position of the virtual camera is controlled on the basis of the position of the head part of the user detected by the position detector 17 of the head-mount display 7. As a result, the user can move the position of the virtual camera (position of the view point) in the virtual space to a desired position in accordance with the movement position of the head part.

The camera-direction control processing part 23 controls the direction of the virtual camera on the basis of the operation input of the user. In this embodiment, the direction of the virtual camera is controlled on the basis of the direction of the head part of the user detected by the direction detector 15 of the head-mount display 7. As a result, the user can change the direction of the virtual camera (the sight line direction) in the virtual space to a desired direction in accordance with the movement direction of the head part.

The camera-position switching processing part 25 switches the position of the virtual camera in a plurality of positions set in advance on the basis of the operation input of the user. In this embodiment, a plurality of positions at which the virtual cameras can be arranged so as to surround the periphery of the female character 19 is set in advance, and the user can switch the position of the virtual camera to a desired position by the operation input through the controller 5. Note that, the camera-position control processing part 21 controls the position of a virtual camera 47 on the basis of the position of the head part detected by the position detector 17 within a predetermined range (within a range with a radius of several meters, for example) around a position switched by the camera-position switching processing part 25.

FIG. 5 shows an example of a switching position of the virtual camera 47. In the example shown in FIG. 5, four spots surrounding the periphery of the female character 19 are set as switching positions, and each of the switching positions is assigned to each of the buttons 11a-11d of the controller 5. For example, in the case that the A button 11a is pressed, the position of the virtual camera 47 is switched to a front position of the female character 19. In the case that the B button 11b is pressed, the position of the virtual camera 47 is switched to a right position of the female character 19. In the case that the C button 11c is pressed, the position of the virtual camera 47 is switched to a rear position of the female character 19. In the case that the D button 11d is pressed, the position of the virtual camera 47 is switched to a left position of the female character 19.

FIG. 6 shows an example of a display screen in the case that the A button 11a is pressed. The front position of the virtual camera 47 is set with a separation distance from the female character 19 longer than the other positions, and as shown in FIG. 6, in the case of being switched to the front position, the entire body of the female character 19 is displayed. In this example, a substantially center position of the body of the female character 19 is displayed substantially at the center position of the screen. Note that, the other switching positions of the virtual camera 47 are shown for explanation in FIG. 6 (actually, they are not shown).

FIG. 7 shows an example of the display screen in the case that the B button 11b is pressed. The right position of the virtual camera 47 is set with a separation distance from the female character 19 shorter than the other positions, and as shown in FIG. 7, in the case of being switched to the right position, substantially the upper body of the female character 19 is displayed. In this example, a substantially center position of the upper body of the female character 19 is displayed substantially at the center position of the screen.

FIG. 8 shows an example of the display screen in the case that the C button 11c is pressed. The rear position of the virtual camera 47 is set with a separation distance from the female character 19 middle, and as shown in FIG. 8, in the case of being switched to the rear position, the portion substantially above the knee of the body of the female character 19 is displayed. In this example, a substantially center position of the portion substantially above the knee of the body of the female character 19 is displayed substantially at the center position of the screen.

Note that, the display screen in the case that the D button 11d is pressed, is not shown.

Note that, each of the display screens is a display of the case that there is no change in the position and the direction of the virtual camera 47 by movement of the head part of the user, that is, the display in the case that the virtual camera 47 is located at the position initially set (position immediately after switching) and is directed to the direction initially set. Therefore, the user can adjust the position and the direction of the virtual camera (view point) to a desired position and direction from the state of each of the display screens by moving the head part. As a result, after coarse adjustment of the direction of watching the female character 19 by switching the position of the virtual camera 47, the user can make fine adjustment by moving the head part by moving the body.

Further, the switching position is an example, and the number, positions, and directions of the switching position, a distance from the female character 19 and the like may be set to those other than the above. Furthermore, the number of characters is also not limited to one, and the switching positions may be set so as to surround a plurality of characters.

Returning to FIG. 2, the camera-direction correction processing part 27 corrects the direction of the virtual camera 47 controlled by the camera-direction control processing part 23 on the basis of a positional relationship between the female character 19 and the virtual camera 47 in the virtual three-dimensional space when the position of the virtual camera 47 is switched by the camera-position switching processing part 25. Specifically, the camera-direction correction processing part 27 corrects the direction of the virtual camera 47 so that the direction of the virtual camera 47 when seen from the vertical direction (Y-axis direction) becomes a direction with the female character 19 on a front. That is, the camera-direction correction processing part 27 corrects only a rotating angle around the vertical axis (Y-axis) without considering an elevation/depression angle (i.e., a pitch angle—an elevation angle and a depression angle to the XZ plane) in the virtual space.

FIGS. 9-12 show a specific example of correction by the camera-direction correction processing part 27. As shown in FIG. 9, for example, in a state where the virtual camera 47 is located on the right of the female character 19 and the user is changing the direction of the virtual camera 47 closer to the front of the female character 19, as shown in FIG. 10, in the case that the virtual camera 47 is switched to the rear position, for example, correction is made only by an angle θ1 in the rotating direction around the Y-axis so that the direction of the virtual camera 47 substantially matches the direction with the female character 19 on the front, that is, a center line CL of the body of the female character 19 substantially matches a center line CLo of the display screen in this example. As a result, in the case that the virtual camera 47 is switched to the rear position, the user enters a state seeing the rear part of the female character 19 from right behind.

Moreover, as shown in FIG. 11, for example, in a state where the virtual camera 47 is located on the right of the female character 19 and the user is changing the direction of the virtual camera 47 closer to above and to the front of the female character 19, as shown in FIG. 12, in the case that the virtual camera 47 is switched to the rear position, for example, the direction of the virtual camera 47 is not changed for the elevation angle to the horizontal plane but is corrected only by an angle θ2 only in the rotating direction around the Y-axis so that the center line CL of the body of the female character 19 substantially matches the center line CLo of the display screen. As a result, in the case that the virtual camera 47 is switched to the rear position, the user enters a state looking up above the rear part of the female character 19 from right behind.

As described above, by correcting only the rotating angle around the vertical axis without considering the elevation/ depression angle in the virtual space, unnatural display that the female character 19 is located on the front by switching the camera position although the virtual camera 47 is directed to an upper direction or a lower direction with respect to the female character 19, can be prevented, and lowering of reality in the virtual space can be prevented. Particularly, in the case of the VR-mode compliant game as in this embodiment, so-called VR sickness of the user caused by wrong positional relationship between the front direction of the user and an upper part (the sky or the like, for example) or a lower part (the ground or the like, for example) in the virtual space can be suppressed.

Note that, after correction is made by the camera-direction correction processing part 27 as above, the direction of the virtual camera 47 by the aforementioned camera-direction control processing part 23 is controlled on the basis of the direction after the correction. In the example shown in FIG. 9, for example, the user rotates the head part in the left direction in the rotating direction around the user before switching of the camera position, but since correction is made so that the female character 19 is located on the front by switching of the camera position, in the case that the user rotates the head part in the right direction to return it to the original direction after the switching, for example, the female character 19 moves to the left side from the center line CLo of the display screen.

Note that, it may be so configured that the user can initialize correction by the camera-direction correction processing part 27 by carrying out a predetermined operation input by using the controller 5 or the head-mount display 7.

Returning to FIG. 2, the first touch determination processing part 29 determines presence or absence of a touch between the virtual camera 47 and the female character 19 present in the virtual three-dimensional space. Note that, the "touch" here includes not only a case that a distance between the virtual camera 47 and the female character 19 becomes 0 but also a case that the distance becomes a predetermined value or less in a separated state. Then, the first object deformation processing part 31 generates deformation in a touched portion of the female character 19 in the case that it is determined by the first touch determination processing part 29 that there was a touch. Note that, the "deformation" here includes not only static deformation such as a recess or dent but also dynamic deformation such as swing or vibration.

In this embodiment, a plurality of control points (not shown) for detecting a collision with another object is set on a surface of the virtual camera 47 and a surface of the skin of the body of the female character 19. The first touch determination processing part 29 determines presence or absence of a touch between the virtual camera 47 and the female character 19 on the basis of a detection result of the control point. The control point may be provided on the entire body of the female character 19 or may be provided only on specific portions such as the chest (breast), the buttocks, the thighs, the abdomen, the upper arm and the like. Similarly, a portion deformable by the first object deformation processing part 31 may be the entire body of the female character 19 or may be only the specific portion. Note that, a deforming method by the first object deformation processing part 31 is not particularly limited, and for example, one or a plurality of reference points is set for each predetermined portion or deformation may be made by moving the plurality of control points constituting the skin surface only by a predetermined direction and amount with respect to the reference points.

FIGS. 13 and 14 show an example of deformation of the female character 19 by a touch with the virtual camera 47. As described above, at each switching position of the virtual camera 47, the user can move the virtual camera 47 closer to or away from the female character 19 by moving the head part. In the example shown in FIG. 13, in a state where the virtual camera 47 is located in front of the female character 19, the user moves the head part so as to move the virtual camera 47 toward a femoral part 49 of the female character 19. Then, in the case that a distance between the virtual camera 47 and the surface of the femoral part 49 becomes a predetermined value or less, it is determined to be touched, and as shown in FIG. 14, a dented portion 51 caused by the touch is generated on the femoral part 49. As a result, it becomes possible for the user to feel that the body of the user (the face or the head part, for example) touches the femoral part 49 of the female character 19, whereby presence of the female character 49 can be made more realistic.

Returning to FIG. 2, the object-position control processing part 33 controls the position of a touch object 53 (an example of a second object. See FIGS. 15 and 16 which will be described later) in the virtual three-dimensional space on the basis of the operation input of the user. The touch object 53 is an object prepared for the user to make a pseudo touch to the female character 19. In this embodiment, the position of the touch object 53 is controlled on the basis of the operation input through the controller 5, for example. Note that, it may be so configured that a sight detection function is provided in the head-mount display 7 so that the position of the touch object 53 can be controlled by the sight line direction, for example. As a result, the user can move the touch object 53 to a desired position in the virtual space.

The second touch determination processing part 35 determines presence or absence of a touch between the touch object 53 and the female character 19. The "touch" here includes not only a case that a distance between the touch object 53 and the female character 19 becomes 0 but also a case that the distance becomes a predetermined value or less in a separated state. Then, the first object deformation processing part 31 generates deformation in a touched portion of the female character 19 in the case that it is determined by the second touch determination processing part 35 that there was a touch. Note that, the "deformation" here includes not only static deformation such as a recess or a dent but also dynamic deformation such as swing or vibration.

FIGS. 15 and 16 show an example of deformation of the female character 19 by a touch with the touch object 53. As described above, the user can freely move the touch object 53 by using the controller 5 and the like. In the example shown in FIG. 15, in a state where the virtual camera 47 is located in front of the female character 19, the user moves the touch object 53 toward an abdomen part 55 of the female character 19. Then, in the case that the distance between the touch object 53 and the surface of the abdomen part 55 becomes a predetermined value or less, it is determined to be touched, and as shown in FIG. 16, a recess portion 57 caused by the touch is generated on the abdomen part 55. As a result, it becomes possible for the user to feel that the body of the user (the hand or the leg, for example) touches the abdomen part 55 of the female character 19, whereby presence of the female character 19 can be made more realistic. Note that, a shape of the touch object 53 shown in FIGS. 15 and 16 is an example and it may be another shape such as an object of a hand, a controller or the like, for example.

Returning to FIG. 2, the vibration generation processing part 37 generates vibration in the controller 5 at least either one of the case that it is determined by the first touch determination processing part 29 that there was a touch between the virtual camera 47 and the female character 19 or the case that it is determined by the second touch determination processing part 35 that there was a touch between the touch object 53 and the female character 19. As a result, the user can feel the touch with the female character 19 more realistically, whereby reality of the virtual space can be improved.

The airflow generation processing part 39 generates virtual airflow, in the case that the controller 5 is moved in a predetermined direction, in a direction along the predetermined direction in the virtual three-dimensional space. Further, the second object deformation processing part 41 generates deformation by an air pressure of the airflow on at least either one of a predetermined portion of the female character 19 and an attached object attached to the female character 19. Note that, the "deformation" here includes not only static deformation such as recess or dent but also dynamic deformation such as swing or vibration or moreover, tearing, breakage, disassembly and the like.

In this embodiment, an acceleration sensor, a gyro sensor or the like (not shown) is provided in the controller 5, for example, and a three-dimensional operation direction or acceleration of the controller 5 is detected. The airflow generation processing part 39 generates a virtual airflow with an air pressure (or an air speed) in a three-dimensional direction along the operation direction of the controller 5 and according to the acceleration of the operation on the basis of a detection result of the sensor.

FIGS. 17-19 show an example of generation of the virtual airflow and deformation of the object by the airflow. As shown in FIG. 17, in a state where the virtual camera 47 is located on the rear of the female character 19, for example, in the case that the controller 5 is operated to a substantially upper left direction, for example (it may be once or several times) as shown in FIG. 18, the virtual airflow in the substantially upper left direction is generated in the virtual space as shown in FIG. 19. In the example shown in FIG. 19, a hair part 59 of the female character 19 flows and a swimming wear 61 (an example of the attached object) of the female character 19 is turned up by the generated airflow.

Note that, a portion of the body other than the hair part 59 of the female character 19 such as the chest (breast), the buttocks, the thighs, the abdomen, the upper arm and the like may be deformed by the airflow. Further, the attached object may be clothes other than the swimming wear, personal belongings, an accessory or the like. Furthermore, a deformation amount of the hair part 59 or the swimming wear 61 may be increased/decreased in accordance with the speed or acceleration of the controller 5 or the number of swing times or the like. Moreover, tearing, breakage, disassembly or the like may be generated in the attached object in the case that the deformation amount exceeds a predetermined amount, for example.

Returning to FIG. 2, the sight line direction detection processing part 43 detects what portion of the female character 19 the line of sight of the user is directed on the basis of at least either one of the direction of the virtual camera 47 and the position of the virtual camera 47. Then, the object behavior control processing part 45 controls a behavior of the female character 19 on the basis of the portion detected by the sight line direction detection processing part 43. Moreover, the object behavior control processing part 45 controls the behavior of the female character 19 on the basis of the touched portion of the female character 19 in at least in either one of the case that it is determined by the first touch determination processing part 29 that there was a touch between the virtual camera 47 and the female character 19 and the case that it is determined by the second touch determination processing part 35 that there was a touch between the touch object 53 and the female character 19. The "behavior" here is movement, voice (words, tone), expressions or the like of the female character 19, for example.

Note that, in addition to or instead of the behavior of the female character 19, on the basis of the portion of the sight line direction or the touched portion, progress itself of the game may be controlled, for example, by finishing of the viewing mode or the like.

As a result, in the case that the user gazes a specific portion (breast or buttocks) of the female character 19 or that the user performs an action of touching the specific portion repeatedly, for example, the female character 19 can be made to be angry or feel offended. Moreover, by stroking the hair part 59 of the female character 19 or by praising the taste of fashion by gazing the hair part 59 or the swimming wear 61, for example, the female character 19 can be made happy to the contrary. Since emotions of the female character 19 can be expressed as above, presence of the female character 19 can be made more realistic.

Note that, processing or the like in each processing part described above is not limited to the example of this processing sharing and may be executed by an even smaller number of processing parts (one processing part, for example), for example, or may be executed by further segmented processing parts. Further, the functions of each processing part described above are implemented by a game program executed by a CPU 101 (see FIG. 21 which will be described later) which will be described later, but a part of them may be implemented by an actual device such as a dedicated integrated circuit such as ASIC, FPGA and the like or other electric circuits and the like, for example.

5. Processing Procedure Executed by Information Processing Device

Subsequently, by using FIG. 20, an example of a processing procedure executed by the CPU 101 in the information processing device 3 will be described.

At Step S105, the information processing device 3 controls the position and the direction of the virtual camera 47 by the camera-position control processing part 21 and the camera-direction control processing part 23 on the basis of the position and the direction of the head part of the user detected by the position detector 17 and the direction detector 15 of the head-mount display 7.

At Step S110, the information processing device 3 controls the position of the touch object 53 in the virtual three-dimensional space by the object-position control processing part 33 on the basis of the operation input through the controller 5.

At Step S115, the information processing device 3 determines whether or not a switching operation of the position of the virtual camera 47 is performed by the camera-position switching processing part 25. In the case that the switching operation of the camera position is performed by pressing on any one of the buttons 11 of the controller 5, for example (Step S115: YES), the routine proceeds to the subsequent Step S120. On the other hand, in the case that the switching operation of the camera position is not performed (Step S115: NO), the routine proceeds to Step S130 which will be described later.

At Step S120, the information processing device 3 switches the position of the virtual camera 47 in a plurality of positions set in advance by the camera-position switching processing part 25 in accordance with the switching operation of the user.

At Step S125, the information processing device 3 corrects the direction of the virtual camera 47 by the camera-direction correction processing part 27 so that the direction of the virtual camera 47 when seen from the vertical direction is made the direction with the female character 19 on the front at the position switched at Step S120.

At Step S130, the information processing device 3 determines presence or absence of a touch between the virtual camera 47 and the female character 19 and presence or absence of a touch between the touch object 53 and the female character 19 by the first touch determination processing part 29 and the second touch determination processing part 35. In the case that it is determined that there is either one of the touches (Step S130: YES), the routine proceeds to the subsequent Step S135. On the other hand, in the case that it is determined that there is none of the touches (Step S130: NO), the routine proceeds to Step S150 which will be described later.

At Step S135, the information processing device 3 generates deformation on a touched portion of the female character 19 by the first object deformation processing part 31.

At Step S140, the information processing device 3 generates vibration in the controller 5 by the vibration generation processing part 37.

At Step S145, the information processing device 3 determines the touch of the virtual camera 47 with the female character 19 or the touch of the touch object 53 with the female character 19 satisfies a predetermined condition. The predetermined condition may be whether or not a touched portion is a specific portion (breast, buttocks or the like), the number of touch times within predetermined period is a predetermined number of times or more, or alternatively a continuous touch period is a predetermined period or more, or the like, for example. In the case that the touch with the female character 19 satisfies the predetermined condition (Step S145: YES), the routine proceeds to Step S160 which will be described later. On the other hand, in the case that the touch with the female character 19 does not satisfy the predetermined condition (Step S145: NO), the routine proceeds to the subsequent Step S150.

At Step S150, the information processing device 3 detects to what portion of the female character 19 the line of sight of the user is directed by the sight line direction detection processing part 43 on the basis of at least either one of the direction of the virtual camera 47 and the position of the virtual camera 47.

At Step S155, the information processing device 3 determines whether or not the sight line direction (portion) detected at Step S150 satisfies a predetermined condition. The predetermined condition may be whether or not a portion to which the line of sight is directed is a specific portion (breast, buttocks or the like), the number of times gazing the specific portion within a predetermined period is a predetermined number of times or more, a period gazing the specific portion is a predetermined period or more, or the like, for example. In the case that the sight line direction satisfies the predetermined condition (Step S155: YES), the routine proceeds to the subsequent Step S160. On the other hand, in the case that the sight line direction does not satisfy the predetermined condition (Step S155: NO), the routine proceeds to the subsequent Step S165.

At Step S160, the information processing device 3 controls the behavior of the female character 19 by the object behavior control processing part 45 such as a behavior that the female character 19 feels offended, for example.

At Step S165, the information processing device 3 determines whether or not the controller 5 has been moved at a predetermined speed or acceleration or more by the airflow generation processing part 39. In the case that the controller 5 has been moved (Step S165: YES), the routine proceeds to the subsequent Step S170. On the other hand, in the case that the controller 5 has not been moved (Step S165: NO), the routine proceeds to Step S175 which will be described later.

At Step S170, the information processing device 3 generates the virtual airflow in the direction along the operation direction of the controller 5 in the virtual three-dimensional space by the airflow generation processing part 39. Then, by the second object deformation processing part 41, deformation by the air pressure of the airflow is generated at least in either one of a predetermined portion of the female character 19 and the swimming wear 61 that the female character 19 wears.

At Step S175, the information processing device 3 determines whether or not a predetermined operation input to finish the game has been made. The operation input to finish the game is an operation to cancel the selection of the viewing mode described in FIG. 3 or the like, for example. In the case that there is no operation input to finish the game (Step S175: NO), the routine returns to the previous Step S105 and repeats the similar procedure. On the other hand, in the case that there is the operation input to finish the game (Step S175: YES), this flow is finished.

Note that, the processing procedure described above is an example, and at least a part of the procedure may be deleted or changed, or a procedure other than the above may be added. Moreover, the order of at least a part of the procedures may be changed or a plurality of procedures may be integrated into a single procedure.

6. Hardware Configuration of the Information Processing Device

A hardware configuration will be described for the information processing device 3 achieving the processing parts implemented by a program executed by the CPU 101 described above, with reference to FIG. 21.

As shown in FIG. 21, the information processing device 3 has, for example, a CPU 101, a ROM 103, a RAM 105, a GPU 106, a dedicated integrated circuit 107 constructed for specific use such as an ASIC or an FPGA, an input device 113, an output device 115, a storage device 117, a drive 119, a connection port 121, and a communication device 123. These constituent elements are mutually connected via a bus 109 and an input/output (I/O) interface 111 such that signals can be transferred.

The game program can be recorded in a ROM 103, the RAM 105, and the storage device 117, for example.

The game program can also temporarily or permanently (non-transitory) be recorded in a removable recording medium 125 such as magnetic disks including flexible disks, various optical disks including CDs, MO disks, and DVDs, and semiconductor memories. The recording medium 125 as described above can be provided as so-called packaged software. In this case, the game program recorded in the recording medium 125 may be read by the drive 119 and recorded in the storage device 117 through the I/O interface 111, the bus 109, etc.

The game program may be recorded in, for example, a download site, another computer, or another recording medium (not shown). In this case, the game program is transferred through a network NW such as a LAN and the Internet and the communication device 123 receives this program. The program received by the communication device 123 may be recorded in the storage device 117 through the I/O interface 111, the bus 109, etc.

The game program may be recorded in appropriate external connection device 127, for example. In this case, the game program may be transferred through the appropriate connection port 121 and recorded in the storage device 117 through the I/O interface 111, the bus 109, etc.

The CPU 101 executes various process in accordance with the program recorded in the storage device 117 to implement the processes of the camera-direction correction processing part 27, the first touch determination processing part 29, etc. In this case, the CPU 101 may directly read and execute the program from the storage device 117 or may be execute the program once loaded in the RAM 105. In the case that the CPU 101 receives the program through, for example, the communication device 123, the drive 119, or the connection port 121, the CPU 101 may directly execute the received program without recording in the storage device 117.

The CPU 101 may execute various processes based on a signal or information input from the input device 113 such as the controller 5 described above, a mouse, a keyboard, and a microphone as needed.

The GPU 106 executes processes for displaying images such as a rendering processing based on a command of the CPU 101.

The CPU 101 and the GPU 106 may output a result of execution of the process from the output device 115 such as the display unit 13 of the head-mount display 7 and a sound output device (not shown), for example. And the CPU 101 and the GPU 106 may transmit this process result to the communication device 123 or the connection port 121 as needed or may record the process result into the storage device 117 or the recording medium 125.

7. Effect of Embodiment

The game program of this embodiment has the information processing device 3 function as the camera-position switching processing part 25 for switching the position of the virtual camera 47 for generating an image of a first-person view point in the virtual three-dimensional space on the basis of the operation input of the user in a plurality of positions set in advance, the camera-direction control processing part 23 for controlling the direction of the virtual camera 47 on the basis of the operation input of the user, and the camera-direction correction processing part 27 for correcting the direction of the virtual camera 47 controlled by the camera-direction control processing part 23 on the basis of a positional relationship between the female character 19 present in the virtual three-dimensional space and the virtual camera 47 when the position of the virtual camera 47 is switched by the camera-position switching processing part 25.

In this embodiment, the user can switch the position of the virtual camera 47 (position of the view point) for generating the image of the first-person view point to a desired position in a plurality of positions set in advance by the operation input and also can control the direction of the virtual camera 47 (direction of sight) to a desired direction. As a result, the user can watch the female character 19 present in the virtual space from various directions. At this time, when the position of the virtual camera 47 is switched, the direction of the virtual camera 47 is corrected on the basis of the positional relationship between the female character 19 and the virtual camera 47. As a result, when the user switches the position of the virtual camera 47 (when the position of the view point is switched), the sight line direction can be corrected so that the female character 19 comes to the front at all times and thus, such a situation that the user loses a direction and loses the line of sight of the female character 19 can be prevented. Moreover, since a feeling of being with the female character 19 at all times in the virtual space can be made, the presence of the female character 19 can be made more realistic. Therefore, reality of the virtual space can be improved.

Moreover, particularly in this embodiment, the camera-direction correction processing part 27 corrects the direction of the virtual camera 47 so that the direction of the virtual camera 47 when seen from the vertical direction becomes a direction with the female character 19 on the front in the virtual three-dimensional space.

As a result, when the direction of the virtual camera 47 is to be corrected, only the rotating angle around the vertical axis can be made a correction target without considering an elevation/depression angle with respect to the horizontal plane in the virtual space. As a result, unnatural display that the female character 19 is located on the front by switching the camera position even though the virtual camera 47 is directed to the upper direction or the lower direction with respect to the female character 19 can be prevented, and lowering of reality in the virtual space can be prevented. Particularly, in the case of the VR (virtual reality) compliant game as in this embodiment, so-called VR sickness of the user caused by wrong positional relationship between the front direction of the user and the upper part (the sky or the like, for example) and the lower part (the ground or the like, for example) in the virtual space can be suppressed.

Moreover, particularly in this embodiment, the information processing device 3 is configured to conduct transmission/reception of a signal with the display unit 13 constituted capable of being attached to the head part of the user and displaying an image and the direction detector 15 for detecting the direction of the head part, and the camera-direction control processing part 23 controls the direction of the virtual camera 47 on the basis of the direction of the head part detected by the direction detector 15.

As a result, since the user can change the direction of the virtual camera 47 (the sight line direction) in the virtual space in accordance with the direction of the head part, the user can experience so-called virtual reality. Therefore, a feeling of immersion in the game can be drastically improved. Moreover, a loss of sense of direction at switching of the view point often occurring when the user is experiencing the virtual reality can be prevented.

Moreover, particularly in this embodiment, the game program has the information processing device 3 conducting transmission/reception of a signal with the position detector 17 for detecting the position of the head part function as the camera-position control processing part 21 for controlling the position of the virtual camera 47 on the basis of the position of the head part detected by the position detector 17 within a predetermined range around a position switched by the camera-position switching processing part 25.

As a result, after coarse adjustment of the direction of watching the female character 19 by switching the position of the virtual camera 47 (switching the view point position), the user can make fine adjustment by moving the head part by moving the body. Therefore, since the user can finely adjust the direction to watch the female character 19, the presence of the female character 19 is made more realistic, whereby reality of the virtual space can be further improved.

Moreover, particularly in this embodiment, the game program has the information processing device 3 function as the sight line direction detection processing part 43 for detecting to what portion of the female character 19 the line of sight of the user is directed on the basis of at least either one of the direction of the virtual camera 47, and the position of the virtual camera 47 and the object behavior control processing part 45 for controlling the behavior of the female character 19 on the basis of the portion detected by the sight line direction detection processing part 43.

As a result, in the case that the female character 19 is a character having emotions, for example, the character can be made offended or happy to the contrary by gazing by the user of a specific portion of the character. Therefore, attractiveness of the game can be improved.

Moreover, according to this embodiment, other than the effects described above, the following effects can be additionally obtained.

The game program of this embodiment has the information processing device 3 function as the camera-position control processing part 21 for controlling the position of the virtual camera 47 for generating an image of the first-person view point in the virtual three-dimensional space on the basis of the operation input of the user, the first touch determination processing part 29 for determining presence or absence of touch between the virtual camera 47 and the female character 19 present in the virtual three-dimensional space, and the first object deformation processing part 31 for generating deformation on a touched portion of the female character 19 in the case that it is determined by the first touch determination processing part 29 that there was a touch.

In this embodiment, the user can arrange the virtual camera 47 for generating an image of the first-person view point at a desired position in the virtual space by the operation input. At this time, in the case that the virtual camera 47 touches the female character 19, the touched portion of the female character 19 is deformed. As a result, the touch by the body of the user (face or the head part, for example) with the female character 19 can be expressed and thus, as compared with only watching the female character 19, the presence of the female character 19 can be made more realistic. Therefore, reality of the virtual space can be improved.

Moreover, particularly in this embodiment, the game program has the information processing device 3 further function as the object-position control processing part 33 for controlling the position of the touch object 53 in the virtual three-dimensional space on the basis of the operation input of the user, and the second touch determination processing part 35 for determining presence or absence of a touch between the touch object 53 and the female character 19, and the first object deformation processing part 31 generates deformation in the touched portion of the female charter 19 in the case that it is determined by the second touch determination processing part 35 that there was a touch.

In this embodiment, the user can position the touch object 53 at a desired position in the virtual three-dimensional space by the operation input. At this time, in the case that the touch object 53 touches the female character 19, the touched portion of the female character 19 is deformed. As a result, since the touch by the body of the user (the hand, the leg or the like, for example) with the female character 19 can be expressed, the presence of the female character 19 can be made more realistic. Therefore, reality of the virtual space can be further improved.

Moreover, particularly in this embodiment, the game program has the information processing device 3 for conducting transmission/reception of a signal with the controller 5 further function as the vibration generation processing part 37 for generating vibration in the controller 5 in at least either one of the case that it is determined by the first touch determination processing part 29 that there was a touch and the case that it is determined by the second touch determination processing part 35 that there was a touch.

As a result, the user can experience the touch with the female character 19 more realistically, whereby reality of the virtual space can be further improved.

Moreover, particularly in this embodiment, the game program has the information processing device 3 function as the airflow generation processing part 39 for generating the virtual airflow in the direction along the predetermined direction in the virtual three-dimensional space in the case that the controller 5 is moved to the predetermined direction, and the second object deformation processing part 41 for generating deformation by the air pressure of the airflow in at least either one of the predetermined portion of the female character 19 and the swimming wear 61 that the female character 19 wears.

As a result, by moving the controller 5 to the predetermined direction, the user can generate the airflow along the operation direction in the virtual space. Moreover, since the deformation according to the direction or strength of the airflow can be generated in the female character 19 or the swimming wear 61, the hair part 59 or the swimming wear 61 of the female character 19 can be made to swing by the airflow, or the like, for example. As described above, since the user can make indirect touch with the female character 19 through the air other than the direct touch, reality of the virtual space can be further improved, and also attractiveness of the game can be improved.

Moreover, particularly in this embodiment, the game program has the information processing device 3 function as the object behavior control processing part 45 for controlling the behavior of the female character 19 on the basis of the touched portion of the female character 19 in at least either one of the case that it is determined by the first touch determination processing part 29 that there was a touch and the case that it is determined by the second touch determination processing part 35 that there was a touch.

As a result, in the case that the female character 19 is a character having emotions, for example, the female character 19 can be made offended or happy to the contrary by touching by the user of a specific portion of the female character 19, or the like. Therefore, attractiveness of the game can be improved.

Moreover, particularly in this embodiment, the information processing device 3 for conducting transmission/reception of a signal with the display unit 13 constituted capable of being attached to the head part of the user and displaying an image, and with the direction detector 15 for detecting the direction of the head part is made to function as the camera-direction control processing part 23 for controlling the direction of the virtual camera 47 on the basis of the direction of the head part detected by the direction detector 15.

As a result, since the user can change the direction of the virtual camera 47 (the sight line direction) in the virtual space in accordance with the direction of the head part, the user can experience so-called virtual reality. Therefore, a feeling of immersion in the game can be drastically improved.

Moreover, particularly in this embodiment, the information processing device 3 is configured to conduct transmission/reception of a signal with the position detector 17 for detecting the position of the head part, and the camera-position control processing part 21 controls the position of the virtual camera 47 on the basis of the position of the head part detected by the position detector 17.

As a result, the user can get closer to, leave away from, or touch the female character 19 by moving the body and by moving the head part. Therefore, the user can feel a touch by the head part of the user with the female character 19 more realistically, whereby reality of the virtual space can be further improved.

8. Modification Example and the Like

Note that, the present invention is not limited to the embodiment and is capable of various modifications within a range not departing from the gist and technical idea thereof.

For example, the case that, in the game program of the present invention, the VR mode is implemented, has been described as an example, but the present invention can be applied also to a game in which the VR mode is not implemented.

Moreover, the case that the present invention is applied to a game for observing an object, has been described as an example, but the present invention can be applied also to games in other genres such as a horror game, a love game, a simulation game, a role playing game, an action game, an adventure game and the like. Particularly, the present invention is suitable for an experience-type game in which the VR mode is implemented.

Moreover, the case that the present invention is a game program has been described, but the present invention can be applied also to an art other than the game, (CAD, computer simulation and the like, for example) such as an image generation program and the like.

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present invention.

What is claimed is:

1. A game processing method executed by an information processing device, comprising:
   generating an image of a first-person view point of a virtual camera in a virtual three-dimensional space at a first position of a plurality of positions set in advance;
   switching the first-person view point from the first position of the virtual camera for generating the image to a second position of the plurality of positions based on an operation input of a user;
   controlling a direction of the virtual camera based on the operation input of the user; and
   correcting the direction of the virtual camera based on a positional relationship between a predetermined object present in the virtual three-dimensional space and the virtual camera when the virtual camera is switched from the first position to the second position by changing a rotating angle of the virtual camera about a vertical axis in the virtual three-dimensional space without changing an elevation/depression angle of the virtual camera with respect to a horizontal plane in the virtual three-dimensional space.

2. The game processing method according to claim 1, wherein the plurality of positions each have a preset rotating angle set in advance and a preset elevation/depression angle set in advance, and
   wherein the correcting of the direction of the virtual camera when the virtual camera is switched from the first position to the second position includes changing the rotating angle of the virtual camera to the preset rotating angle of the second position without changing the elevation/depression angle of the virtual camera to the preset elevation/depression angle of the second position.

3. The game processing method according to claim 2, further comprising:
   detecting a direction of a head part of the user,
   wherein the controlling of the direction of the virtual camera comprises controlling the direction of the virtual camera based on the direction of the head part detected.

4. The game processing method according to claim 3, further comprising:
   detecting a position of the head part of the user; and
   controlling a position of the virtual camera based on the position of the head part detected in a predetermined range around a current position of the plurality of positions at which the virtual camera is located.

5. The game processing method according to claim 4, further comprising:
   detecting to what portion in the object a line of sight of the user is directed based on at least one of the direction of the virtual camera and the position of the virtual camera; and
   controlling a behavior of the object based on the detected portion.

6. A non-transitory recording medium readable by an information processing device, the recording medium storing a game program programmed to cause the information processing device to:
   generate an image of a first-person view point of a virtual camera in a virtual three-dimensional space at a first position of a plurality of positions set in advance;
   switch the first-person view point from the first position of the virtual camera for generating the image to a second position of the plurality of positions based on an operation input of a user;
   control a direction of the virtual camera based on the operation input of the user; and
   correct the direction of the virtual camera based on a positional relationship between a predetermined object present in the virtual three-dimensional space and the virtual camera when the virtual camera is switched from the first position to the second position by changing a rotating angle of the virtual camera about a vertical axis in the virtual three-dimensional space without changing an elevation/depression angle of the virtual camera with respect to a horizontal plane in the virtual three-dimensional space.

7. The recording medium according to claim 6,
   wherein the plurality of positions each have a preset rotating angle set in advance and a preset elevation/depression angle set in advance, and
   wherein the correcting of the direction of the virtual camera when the virtual camera is switched from the first position to the second position includes changing the rotating angle of the virtual camera to the preset rotating angle of the second position without changing the elevation/depression angle of the virtual camera to the preset elevation/depression angle of the second position.

8. The recording medium according to claim 7,
wherein the game program is further programmed to cause the information processing device to transmit or receive a signal with a display unit to display the image and a direction detector to detect a direction of a head part of the user, the display unit and the direction detector are configured to be attached to the head part, and
wherein the correcting of the direction of the virtual camera when the virtual camera is switched from the first position to the second position includes controlling the direction of the virtual camera based on the direction of the head part detected by the direction detector.

9. The recording medium according to claim 8,
wherein the game program is further programmed to cause the information processing device to transmit or receive a signal with a position detector to detect a position of the head part, and
wherein the game program is further programmed to cause the information processing device to control a position of the virtual camera based on the position of the head part detected by the position detector in a predetermined range around a current position of the plurality of positions at which the virtual camera is located.

10. The recording medium according to claim 9, wherein the game program is further programmed to cause the information processing device to:
    detect to what portion in the object a line of sight of the user is directed based on at least one of the direction of the virtual camera and the position of the virtual camera; and
    control a behavior of the object based on the portion detected using the line of sight.

* * * * *